United States Patent
Yamakawa

(10) Patent No.: US 10,168,574 B2
(45) Date of Patent: Jan. 1, 2019

(54) LIGHT SOURCE DEVICE AND DISPLAY APPARATUS

(71) Applicant: SAKAI DISPLAY PRODUCTS CORPORATION, Sakai-shi, Osaka (JP)

(72) Inventor: Ryo Yamakawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/787,993

(22) Filed: Oct. 19, 2017

(65) Prior Publication Data
US 2018/0039137 A1 Feb. 8, 2018

Related U.S. Application Data

(63) Continuation of application No. PCT/JP2015/062260, filed on Apr. 22, 2015.

(51) Int. Cl.
*G02F 1/1333* (2006.01)
*G02F 1/1339* (2006.01)
*G02F 1/1335* (2006.01)
*F21V 8/00* (2006.01)

(52) U.S. Cl.
CPC ..... *G02F 1/133608* (2013.01); *G02B 6/0088* (2013.01); *G02F 1/13394* (2013.01); *G02B 6/0073* (2013.01); *G02F 1/133603* (2013.01); *G02F 1/133606* (2013.01); *G02F 2001/133314* (2013.01); *G02F 2001/133317* (2013.01)

(58) Field of Classification Search
CPC ........... G02B 6/0088; G02B 6/0073; G02F 1/133603; G02F 1/13394; G02F 1/133608; G02F 1/133308; G02F 2001/133317
See application file for complete search history.

(56) References Cited

U.S. PATENT DOCUMENTS

| | | | |
|---|---|---|---|
| 2005/0062899 A1 | 3/2005 | Fukayama et al. | |
| 2015/0015798 A1* | 1/2015 | Masuda | G02F 1/1333 348/794 |
| 2015/0192822 A1* | 7/2015 | Katou | G02F 1/133308 349/58 |
| 2015/0212261 A1* | 7/2015 | Masuda | G02F 1/133308 348/794 |
| 2016/0131831 A1* | 5/2016 | Tomomasa | G02B 6/0031 348/790 |

FOREIGN PATENT DOCUMENTS

JP 2005-91971 A 4/2005

* cited by examiner

*Primary Examiner* — Jia Pan
(74) *Attorney, Agent, or Firm* — Greer Burns & Crain Ltd.

(57) ABSTRACT

A light source device comprises: a light source; a light-transmissive plate having a side surface or a main surface facing the light source; a holding frame having a frame-shaped surface holding a peripheral edge portion of the light-transmissive plate, the holding frame having a frame shape; and a spacer provided between the peripheral edge portion of the light-transmissive plate and the frame-shaped surface of the holding frame. The holding frame comprises: a first rib provided on the frame-shaped surface, at a position closer to an outer edge of the holding frame than a contact position of the frame-shaped surface in contact with the spacer is, the first rib extending along the frame shape; and a first recessed portion provided between the first rib and the contact position.

4 Claims, 6 Drawing Sheets

LIGHT SOURCE DEVICE AND DISPLAY APPARATUS

This is a continuation of International Application No. PCT/JP2015/062260, with an international filing date of Apr. 22, 2015, the entire contents of which are hereby incorporated by reference.

BACKGROUND OF THE INVENTION

1. Field of the Invention

The present disclosure relates to a display apparatus displaying an image by use of a liquid crystal panel, and specifically, to a light source device maintaining display quality at a high level and a display apparatus including such a light source device.

2. Description of the Related Art

A display apparatus including a liquid crystal panel needs to include a light source device providing light to the liquid crystal panel. The light source device may be of an edge light type or a direct type.

A light source device of an edge light type includes a light-transmissive plats having a main surface (i.e., a broad surface) that faces the liquid crystal panel, light sources such as light emitting diodes or the like that face one or a plurality of side surfaces of the light-transmissive plate with a predetermined gap from the side surface(s), and an optical sheet that is provided between the liquid crystal panel and the light-transmissive plate, where the optical sheet diffuses or collects light. In the light source device of an edge light type, the light-transmissive plate acts as a light guide plate allowing light from the light sources to enter thereinto from an end surface thereof and propagate therein and output ting the light from various positions in the main surface uniformly.

A light source device of a direct type includes a light-transmissive plate having one main surface (i.e., a broad surface) that faces the liquid crystal panel, light sources such as light emitting diodes or the like that face another main surface of the light-transmissive plate opposite to the one main surface with a predetermined gap from the opposite surface, and an optical sheet that is provided between the liquid crystal panel and the light-transmissive plate like in the light source device of an edge light type. In the light source device of a direct type, the light-transmissive plate acts as a diffusive plate allowing light from the light sources to enter thereinto from the other main surface and propagate therein, scattering the light by a scattering body provided therein and outputting the light from various positions in the one main surface uniformly.

In either type of light source device, the light-transmissive plate used as the light guide plate or the diffusive plate is forced of a resin material such as PMMA (Poly(methyl methacrylate)), MS (Polymethacrylic styrene) or the like. The light-transmissive plate is relatively highly flexible and therefore needs to be held by a housing, a holding member or the like to be positioned appropriately. For allowing the light-transmissive plate to be accommodated in a housing or a holding member, a spacer formed of a flexible material is bonded between the transparent plate and the housing or the holding member in order to keep the distance between these components and to absorb vibrations.

However, the light-transmissive plate expands and contracts by heat and also by an influence of moisture. When being used for a light source device, the light-transmissive plate is heated by the heat from the light source and is cooled while the light source is in an off state, and thus expands and contracts. Such expansion and contraction applies force to the spacer between the light-transmissive plate and the housing or the holding member. In the case where the adhesive force of the spacer is low, the spacer is displaced. The displacement of the spacer, for example, decreases the vibration absorption function, or allows foreign substances to enter the inside of the display apparatus due to a gap formed between the light-transmissive plate and the housing or the holding member. As a result, the display quality is decreased.

Japanese Laid-Open Patent Publication No. 2005-091971 discloses a light source device in which a spacer of a special shape is secured to a portion of the light source device where a liquid crystal panel is to be set, so that the stress load on the liquid crystal panel is decreased in the state where the liquid crystal panel is set, and foreign substances are prevented from entering a space between the liquid crystal panel and the light source device.

SUMMARY OF THE INVENTION

The structure of the spacer disclosed in Japanese Laid-open Patent Publication No. 2005-091971 is applicable to a spacer provided between the light-transmissive plate and the housing or the holding member of the light source device. However, the spacer disclosed in Japanese Laid-open Patent Publication No. 2005-091971 is structured in order to absorb impact between the liquid crystal panel and the light source device, and to prevent entrance of foreign substances to a space between the liquid crystal panel and the light source device. Japanese Laid-Open Patent Publication No. 2005-091971 does not consider that the spacer is displaced by being heated and cooled repeatedly by a heat source, which is the light source of the light source device. In addition, in Japanese Laid-Open Patent Publication No. 2005-091971, the spacer has a special shape to provide the above-described functions. It costs high to form the spacer to have such a special shape.

The present invention made in light of the above-described situation has an object of providing a light source device preventing displacement of a spacer with a simple structure and thus preventing a display fault, which would otherwise be caused due to decrease in the vibration absorption function, incorporation of foreign substances or the like, and also of providing a display apparatus including such a light source device.

A light source device according to one embodiment of the present invention includes a light source; a light-transmissive plate having a side surface or a main surface facing the light source; a holding frame having a frame-shaped surface holding a peripheral edge portion of the light-transmissive plate, the holding frame having a frame shape; and a spacer provided between the peripheral edge portion of the light-transmissive plate and the frame-shaped surface of the holding frame. The holding frame includes a rib provided on the frame-shaped surface, at a position closer to an outer edge of the holding frame than a contact position of the frame-shaped surface in contact with the spacer is, the rib extending along the frame shape; and a recessed portion provided between the rib and the contact position.

In the light source device according to one embodiment of the present invention, the rib is provided on the frame-shaped surface all along a circumferential direction thereof; and the recessed portion includes a plurality of linear grooves along the rib.

In the light source device according to one embodiment of the present invention, the holding frame further includes a rib provided on an opposite surface opposite to the frame-shaped surface, the rib being along the frame shape; and a recessed portion provided at a position closer to the outer edge of the holding frame than the rib provided on the opposite surface is.

A display apparatus according so one embodiment of the present invention includes a light source; a light-transmissive plate having a side surface or a main surface facing the light source; a holding frame having a first frame-shaped surface holding a peripheral edge portion of the light-transmissive plate, the holding frame having a frame shape; a first spacer provided between the peripheral edge portion of the light-transmissive plate and the first frame-shaped surface of the holding frame; a liquid crystal panel having a peripheral edge portion held by a second frame-shaped surface of the holding frame opposite to the first frame-shaped surface, the liquid crystal panel facing the light-transmissive plate; and a second spacer provided between the peripheral edge portion of the liquid crystal panel and the second frame-shaped surface of the holding frame. Light output from the light-transmissive plate is directed toward the liquid crystal panel. The holding frame includes a first rib provided on the first frame-shaped surface, at a position closer to an outer edge of the holding frame than a first contact position of the first frame-shaped surface in contact with the first spacer is, the first rib extending along the frame shape; and a first recessed portion provided between the first rib and the first contact position.

In the display apparatus according to one embodiment of the present invention, the holding frame further includes a second rib provided on the second frame-shaped surface, at a position closer to an inner edge of the holding frame than a second contact position of the second frame-shaped surface in contact with the second spacer is, the second rib extending along the frame shape; and a second recessed portion provided between the second rib and the second contact position.

According to one embodiment of the present invention, a rib is provided on the frame-shaped surface holding the light-transmissive plate, at a position closer to the outer edge than the contact position of the frame-shaped surface in contact with the spacer (first spacer) is, and also includes a recessed portion at a position closer to the spacer than the rib is. When the light-transmissive plate expands and contacts repeatedly by the influence of heat from the light source or ambient moisture, the spacer follows the expansion and contraction of the light-transmissive plate to be gradually displaced toward the outer edge. This displacement is restricted by the spacer contacting the rib. When the spacer reaches the rib, a part of the deformed spacer, which would otherwise go beyond the rib, is absorbed into the recessed portion located closer to the spacer than the rib is. As a result, the undesirable possibility that the spacer goes beyond, the rib is decreased.

According to one embodiment of the present invention, the recessed portion includes a plurality of grooves. Therefore, when the spacer (first spacer) reaches the grooves, the surface between the grooves supports the spacer. Thus, a majority of, or the entirety of, the spacer is suppressed from entering the grooves. This avoids formation of a gap between the light-transmissive plate and the holding frame and also avoids the decrease in the impact absorption capability.

According to one embodiment of the present invention, the holding frame includes a rib and a recessed portion on a surface thereof that faces the liquid crystal panel (or cover glass, etc.) and is in contact with the spacer (second spacer), in addition to a surface thereof that faces the light-transmissive plate, such as a diffusive plate or a light guide plate, and is in contact with the spacer (first spacer). On the surface of the holding frame that faces the liquid crystal panel and is in contact with the spacer, a rib is provided at a position closer to the inner edge than the spacer is, and a recessed portion is provided closer to the spacer than the rib is. When the holding frame itself expands and contacts repeatedly by the influence of heat from the light source, the spacer between the holding frame and the liquid crystal panel moves in conformity to the expansion and contraction of the holding frame and is gradually displaced toward the inner edge. When the spacer reaches the rib, a part of the deformed spacer, which would otherwise go beyond the rib, is absorbed into the recessed portion located closer to the spacer than the rib is. As a result, the undesirable possibility that the spacer goes beyond the rib is decreased. Thus, the entrance of the spacer to the display region is avoided.

According to one embodiment of the present invention, the undesirable possibility that the spacer goes beyond the rib is decreased, and the spacer is prevented from being displaced. Therefore, the decrease in the vibration absorption function, the entrance of foreign substances and the like are avoided, and the display quality of the display apparatus is maintained high.

DETAILED DESCRIPTION OF PREFERRED EMBODIMENTS

Hereinafter, embodiments of the present invention will be specifically described in detail with reference to the drawings. In the following embodiments, an example in which the present invention is applied to a display apparatus including a liquid crystal panel will be described in detail.

Embodiment 1

Figure 1:
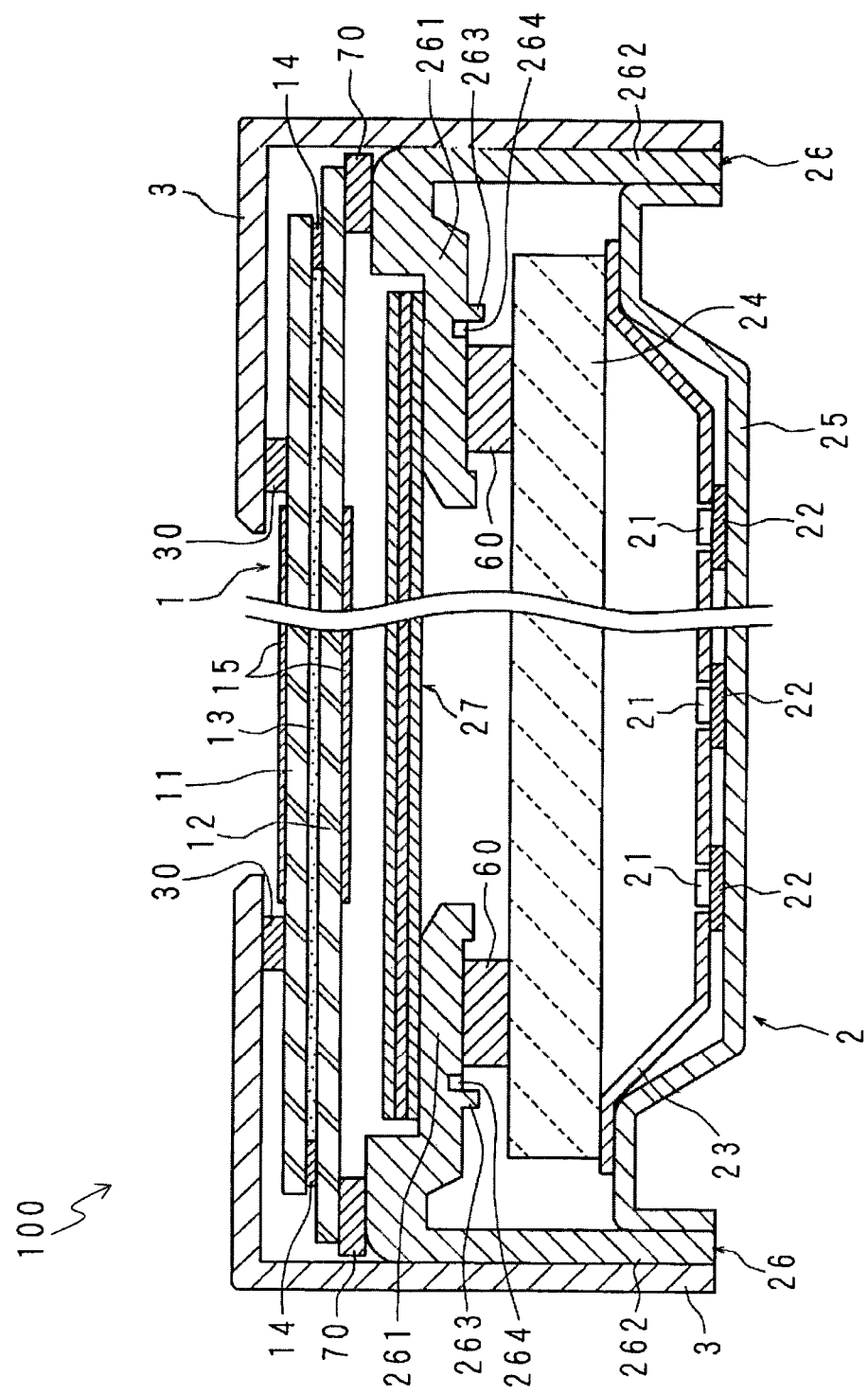
FIG. 1 is a cross-sectional view schematically showing a part of a display apparatus in embodiment 1.

FIG. 1 is cross-sectional view schematically showing a part of a display apparatus 100 in embodiment 1. The display apparatus 100 includes a liquid crystal panel 1 and a light source device 2.

The liquid crystal panel 1 is a display panel, and has a shape of a flat rectangular plate. The liquid crystal panel 1 includes two glass substrates 11 and 12 located to face each other while having a predetermined gap therebetween, a liquid crystal material 13 injected into the gap between the glass substrates 11 and 12, and a sealing member 14 sealing the liquid crystal material 13. The glass substrates 11 and 12 each have a polarizer film 15 smaller than the glass substrates 11 and 12 bonded thereto. In this specification, an expression that a component is smaller or larger than another component indicates that the components is smaller or larger than the another component when seen in a plan view, unless otherwise specified.

The light source device 2 is of a direct type using a plurality of light emitting diodes 21 as a light source.

The light emitting diodes 21 are each a light emitting element that includes a diode emitting blue light or ultraviolet light and a fluorescent material applied to a surface of the diode and thus emits white light. The plurality of light emitting diodes 21 are arrayed at generally the same interval on surfaces of a plurality of substrates 22. Circuits controlling the light emitting diodes 21 to be on or off are also provided on the surfaces of the substrates 22.

A reflective sheet 23 is an optical sheet having a stack structure including a base substrate formed of a PET film or a PET plate and a reflective layer formed of a metal material or the like.

A diffusive plate 24 is a rectangular light-transmissive plate. The diffusive plate 24 is formed off for example, an acrylic resin containing microparticles, called, "light diffusive members", incorporated thereto.

An optical sheet 2 includes a group of rectangular sheets including a PET film as a base substrate. The optical sheet 27 includes, for example, three optical sheets, specifically, a lens sheet, a prism sheer and a diffusive sheet.

A first chassis 25 is a rectangular shallow metal box having an opening at one surface, and includes a peripheral edge portion having an appropriate width.

Figure 2:
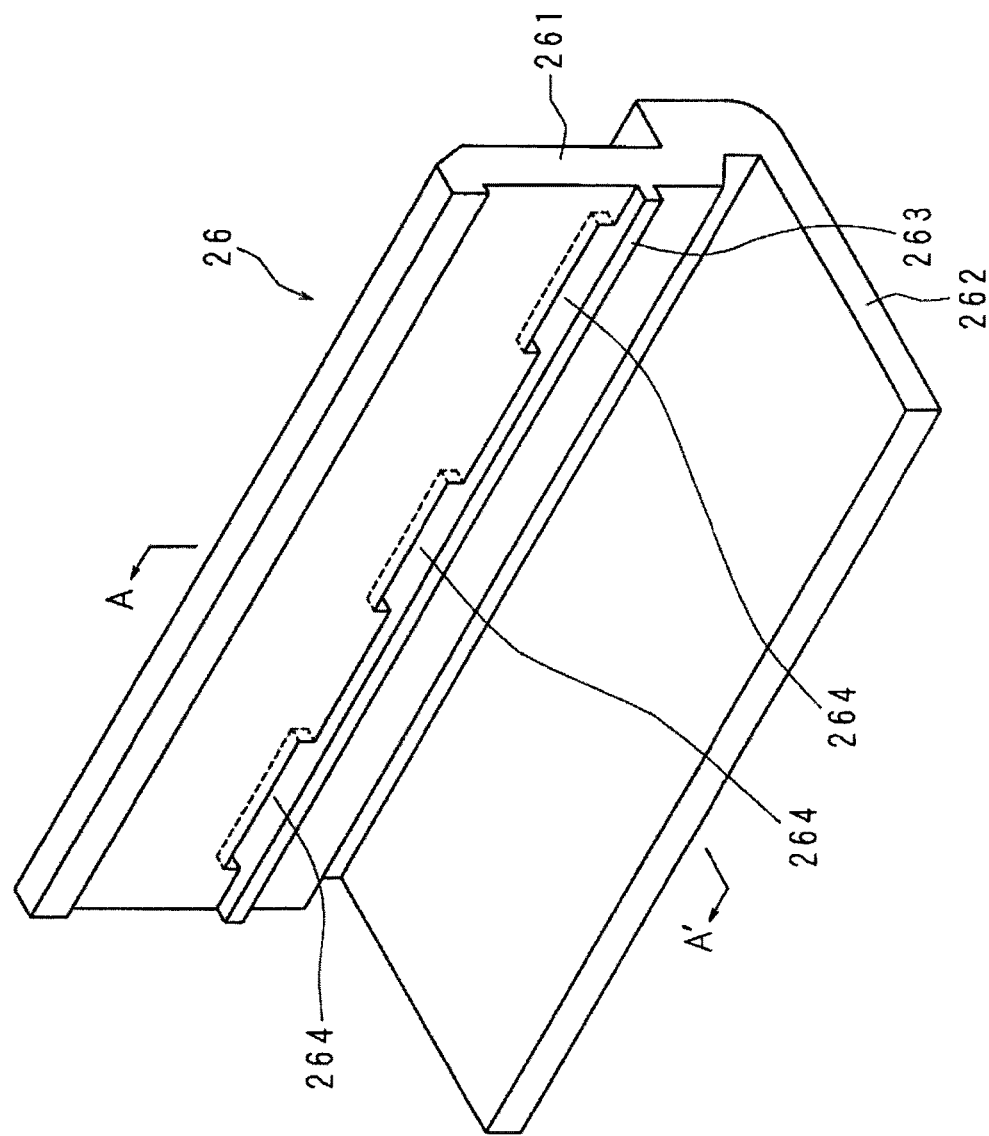
FIG. 2 is a schematic isometric view showing a part of a second chassis in embodiment 1.

A second chassis 26 is a metal or resin frame body including a rectangular frame portion 261 and a peripheral plate 262 protruding from an outer edge of the rectangular frame portion 261. The second chassis 26 has a frame shape. An inner circumference of the peripheral plate 262 of the second chassis 26 approximately matches an outer circumference of the first chassis 25. The second chassis 26 includes, for example, four angle bars having an L-shaped cross-section that are coupled with each other. Now, the second chassis 26 will be described in detail with reference to FIG. 2. FIG. 2 is a schematic isometric view showing a part of the second chassis 26 in embodiment 1. The cross-section of the second chassis 26 shown in FIG. 1 corresponds to a cross-section taken along line A-A' in FIG. 2. Among two inner surfaces of the angle bar (inner surfaces of the L-shape) included in the second chassis 26 (the bottom surface and the inner side surface in FIG. 1), the surface of the rectangular frame portion 261 (the bottom surface of the rectangular frame portion 261 in FIG. 1) has a rib 263 provided thereon along the entire length of the angle bars. Thus, the rib 263 is provided on the rectangular frame portion 261, and extends all along a circumferential direction thereof, namely, extends along the frame shape of the second chassis 26. The second chassis 26 includes a plurality of grooves (recessed portion) 264 formed therein. The grooves 264 are formed at a positron adjacent to an inner side surface of the rib 263. As shown in FIG. 2, the plurality of grooves 264 have a predetermined length and are provided at a predetermined interval along the rib 263.

Returning to FIG. 1, the light source device 2 is assembled as follows, and is included in the display apparatus 100 together with the liquid crystal panel 1.

On a bottom surface of the first chassis 25, the plurality of substrates 22 having the light emitting diodes 21 mounted thereon are located. Next, the reflective sheet 23 is located along an inner wall of the first chassis 25. The reflective sheet 23 is slightly smaller than the peripheral edge portion of the first chassis 25. The reflective sheet 23 has holes in positional correspondence with the light emitting diodes 21, so that light emitting surfaces of the light emitting diodes 21 are exposed. Next, the diffusive plate 24 is located on the peripheral edge portion of the first chassis 25 such that the reflective sheet 23 is held between the peripheral edge portion of the first chassis 25 and the diffusive plate 24. The diffusive plate 24 is smaller than the reflective sheet 23, and is supported by the peripheral edge portion of the first chassis 25.

Next, the second chassis 26 is located. On the bottom surface of the rectangular frame portion 261 of the second chassis 26, a spacer 60 is provided at a position closer to an inner edge of the rectangular frame portion 261 than the grooves 264 are. The spacer 60 extends all along a circumferential direction of the rectangular frame portion 261. The spacer 60 is higher than the rib 263. The spacer 60 is formed of a flexible material such as, for example, rubber or the like, and is bonded and secured to the second chassis 26 with a double-sided adhesive tape. The spacer 60 may be light-blocking. The second chassis 26 is located such that a surface of the spacer 60 opposite to the surface bonded to the second chassis 26 is in contact with a peripheral edge portion of the diffusive plate 24, the rectangular frame portion 261 covers the peripheral edge portion of the diffusive plane 24, and an outer circumferential surface of a side plate of the first chassis 25 is fit to an inner surface of the peripheral plate 262 of the second chassis 26. With such a structure, the reflective sheet 23 and the diffusive plate 24 are held between the first chassis 25 and the second chassis 26, and are accommodated together with the light emitting diodes 21 and the substrates 22.

Next, the optical sheet 27 as located, and thus the light source device 2 is formed. The optical sheet 27 is larger than an inner opening of the second chassis 26, which is a frame body, namely an inner opening of the rectangular frame portion 261. The rectangular frame portion 261 also has a recessed portion on a top surface thereof. The recessed portion is formed along a peripheral edge of the inner opening. A peripheral edge of the optical sheet 27 is fit into the recessed portion and is held by the rectangular frame portion 261.

The liquid crystal panel 1 is located on the light source device 2. The liquid crystal panel 1 is slightly smaller than the second chassis 26, and has such a size to cover the recessed portion of the rectangular frame portion 261 that is formed along the peripheral edge of the inner opening of the rectangular frame portion 261. A spacer 70 is provided on an outer peripheral edge portion of the second chassis 26 that is outer to the recessed portion formed along the peripheral edge of the inner opening of the rectangular frame portion 261. The spacer 70 extends all along a circumferential direction of the outer peripheral edge portion. The spacer 70 is formed of a flexible material such as, for example, rubber, and is bonded and secured to the second chassis 26 with a double-sided adhesive tape. The liquid crystal panel 1 is located on the light source device 2 such that an outer peripheral edge of an exposed surface of the glass substrate 12 of the liquid crystal panel 1 contacts the spacer 70.

Next, a bezel 3 is located. The bezel 3 is formed of, for example, a metal material, and is a frame body formed of angle bars having an L-shaped cross-section. A spacer 30 is provided at a position slightly outer to an inner opening of the bezel 3. The spacer 30 extends all along a circumference of the bezel 3. The spacer 30 is formed of a flexible material such as, for example, rubber, and is bonded and secured to the bezel 3 with a double-sided adhesive tape. The spacer 30 may be light-blocking. An inner circumference of the bezel 3 approximately matches an outer circumference of the peripheral plate 262 of the second chassis 26. The inner opening of the bezel 3 is smaller than the liquid crystal panel 1, and in more detail, is smaller than the polarizer film 15 bonded to the glass substrate 11. The bezel 3 is located on the liquid crystal panel 1 such that an outer peripheral edge of an exposed surface of the glass substrate 11 of the liquid crystal panel 1 contacts the spacer 30. In this step, the liquid crystal panel 1 is located such that an outer circumferential surface of the peripheral plate 262 of the second chassis 26 is fit to an inner circumferential surface of a peripheral plate of the bezel 3. The bezel 3, the second chassis 26 and the first chassis 25 are coupled together, so chat the liquid crystal panel 1 is held by the bezel 3 and the second chassis 26, and thus the display apparatus 100 is formed. In this state, a display region of the liquid crystal panel 1 is exposed from the inner opening of the bezel 3 and is visible from outside.

In the display apparatus 100 having the above-described structure, light from the light emitting diodes 21 located on the substrates 22 in the light source device 2 is incident on the diffusive plate 24 directly or after being reflected by the reflective sheet 23. In the diffusive plate 24, the incident light is repeatedly scattered by the light diffusive members, and is uniformly output from various positions of an output surface of the diffusive plate 24 opposite to a surface thereof facing the light emitting diodes 21. The light output from the diffusive plate 24 passes the optical sheet 27 and thus is output as more uniform planar light. In this manner, the light source device 2 acts as a planar light source that outputs light of a uniform illuminance. The planar light output from the optical sheet 27 is directed toward the liquid crystal panel 1, and is modulated at positions corresponding to a plurality of pixels in the liquid crystal panel 1 based on an image signal. In this manner, a viewer visually recognizes a moving image on the display apparatus 100.

In the light source device 2 in embodiment 1, the diffusive plate 24 expands and contracts as a result of being heated and cooled mainly by a heat source, which is the light emitting diodes 21. Such expansion and contraction of the diffusive plate 24 displaces the spacer 60 toward an outer edge of the second chassis 26. The spacer 60 is bonded to the second chassis 26, which holds the diffusive plate 24 together with the first chassis 25. Such displacement is stopped by the spacer 60 contacting the rib 263. However, in the case where the force of displacement is strong, the spacer 60 may undesirably go beyond the rib 263. In embodiment 1, the second chassis 26 includes the grooves 264 at a position closer to an outer edge thereof in FIG. 2 (at a position closer to the spacer 60 in FIG. 1) than the rib 263 is. The grooves 264 prevent the spacer 60 from going beyond the rib 263. Hereinafter, how the rib 263 and the grooves 264 prevent the spacer 60 from going beyond the rib 263 will be described in detail with reference to the drawings.

Figure 3:
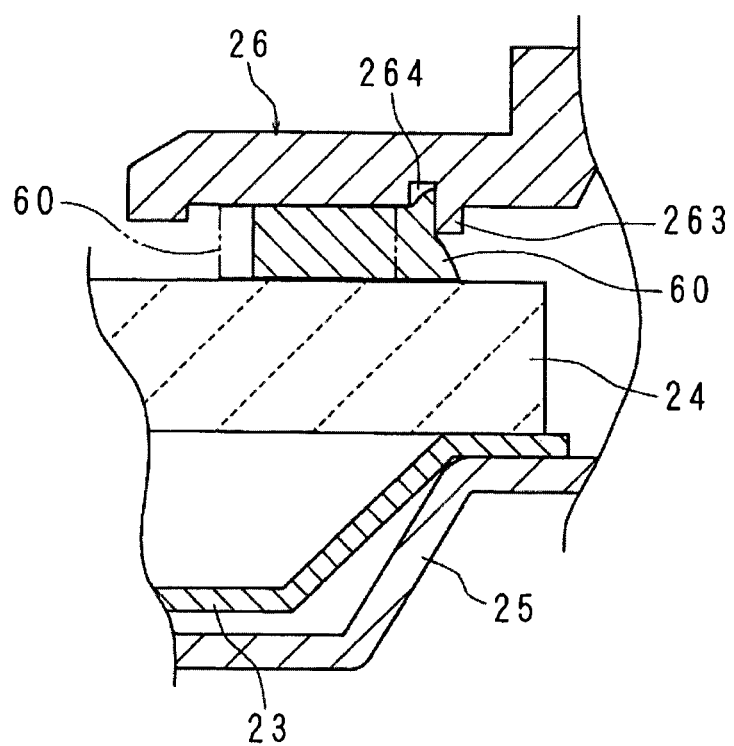
FIG. 3 shows a time-wise positional change of a spacer.

FIG. 3 shows a time-wise positional change of the spacer 60. FIG. 3 is an enlarged view of the spacer 60 and the vicinity thereof in the display apparatus 100 shown in FIG. 1. The two-dot chain line represents the position of the spacer 60 when the assembly of the display apparatus 100 is finished. When, for example, the display apparatus 100 is turned on, the light emitting diodes 21 are lit up and thus the temperature inside the light source device 2 starts rising. As a result, the diffusive plate 24 expands. At the time when the temperature rise starts, the frictional force between the diffusive plate 24 and the spacer 60 is stronger than the adhesive strength of the spacer 60 to the second chassis 26. Therefore, the spacer 60 follows the expansion of the diffusive plate 24, namely, is displaced toward the outer edge of the second chassis 26. Along with the temperature rise, the adhesive strength of the spacer 60 to the second chassis 26 becomes stronger than the fractional force between the diffusive plate 24 and the spacer 60. The force of the spacer 60 of following the expansion of the diffusive plate 24 is decreased. Then, when the display apparatus 100 is turned off, the light emitting diodes 21 are extinguished and thus the temperature in the light source device 2 starts falling. As a result, the diffusive plate 24 contracts. At this point, the temperature is still high. Therefore, the adhesive strength of the spacer 60 to the second chassis 26 is stronger than the frictional force between the diffusive plate 24 and the spacer 60. Thus, at the time when the temperature starts falling, the amount of displacement of the spacer 60 in the direction of following the contraction of the diffusive plate 24 (displacement of the spacer 60 toward an inner edge of the second chassis 26) is smaller than the amount of displacement toward the outer edge of the second chassis 26 at the time of the start of the temperature rise. Namely, when the temperature starts rising, the spacer 60 is easily displaced toward the outer edge on the second chassis 26, whereas when the temperature starts falling, the spacer 60 is not easily displaced toward the inner edge of the second chassis 26. For this reason, as the light source device 2 is heated and cooled repeatedly, the spacer 60 is gradually displaced toward the outer edge, namely, toward the rib 263 as shown in FIG. 3.

In embodiment 1, the light scarce device 2 includes the rib 263 in order to suppress the spacer 60 from being displaced toward the outer edge. The rib 263 is lower than the spacer 60, and there is a gap between the rib 263 and the diffusive plate 24. Therefore, in the case where the force of displacement of the spacer 60 is strong, the spacer 60 is deformed to protrude into the space and may undesirably go beyond the rib 263. In embodiment 1, the second chassis 26 of the light source device 2 includes the grooves 264 closer to the inner edge than the rib 263 is. When the spacer 60 reaches the rib 263 after being displaced continuously, the grooves 264 allow the spacer 60 to be deformed to protrude into the grooves 264. Therefore, a part of the deformed spacer 60, which would otherwise go beyond the rib 263, is absorbed into the grooves 264. As a result, the spacer 60 is suppressed from protruding through the gap between the rib 263 and the diffusive plate 24, and the undesirable possibility that the spacer 60 goes beyond the rib 263 is decreased. If the spacer 60 goes beyond the rib 263 and is further displaced toward the outer edge between the diffusive plate 24 and the second chassis 26, the spacer 60 loses the holding function and the impact absorption function and also a gap is formed between the diffusive plate 24 and the second chassis 26. In this embodiment, such a loss of the holding function and the impact absorption function and the formation of the gap between the diffusive plate 24 and the second chassis 26 are prevented.

As shown in FIG. 2, the grooves 264 have a predetermined length and are provided at a predetermined interval. Therefore, a part of the spacer 60 is supported by an inner surface of the rectangular frame portion 261 corresponding to the predetermined interval. Since the plurality of grooves 264 are provided at a predetermined interval, a majority of, or the entirety of, the spacer 60 formed of a flexible material is suppressed from entering the grooves 264. Therefore, the contact area size between the spacer 60 and the diffusive plate 24 is suppressed from being decreased, and thus the decrease in the impact absorption function and formation of a gap between the spacer 60 and the diffusive plate 24 are suppressed.

Embodiment 2

Figure 4:
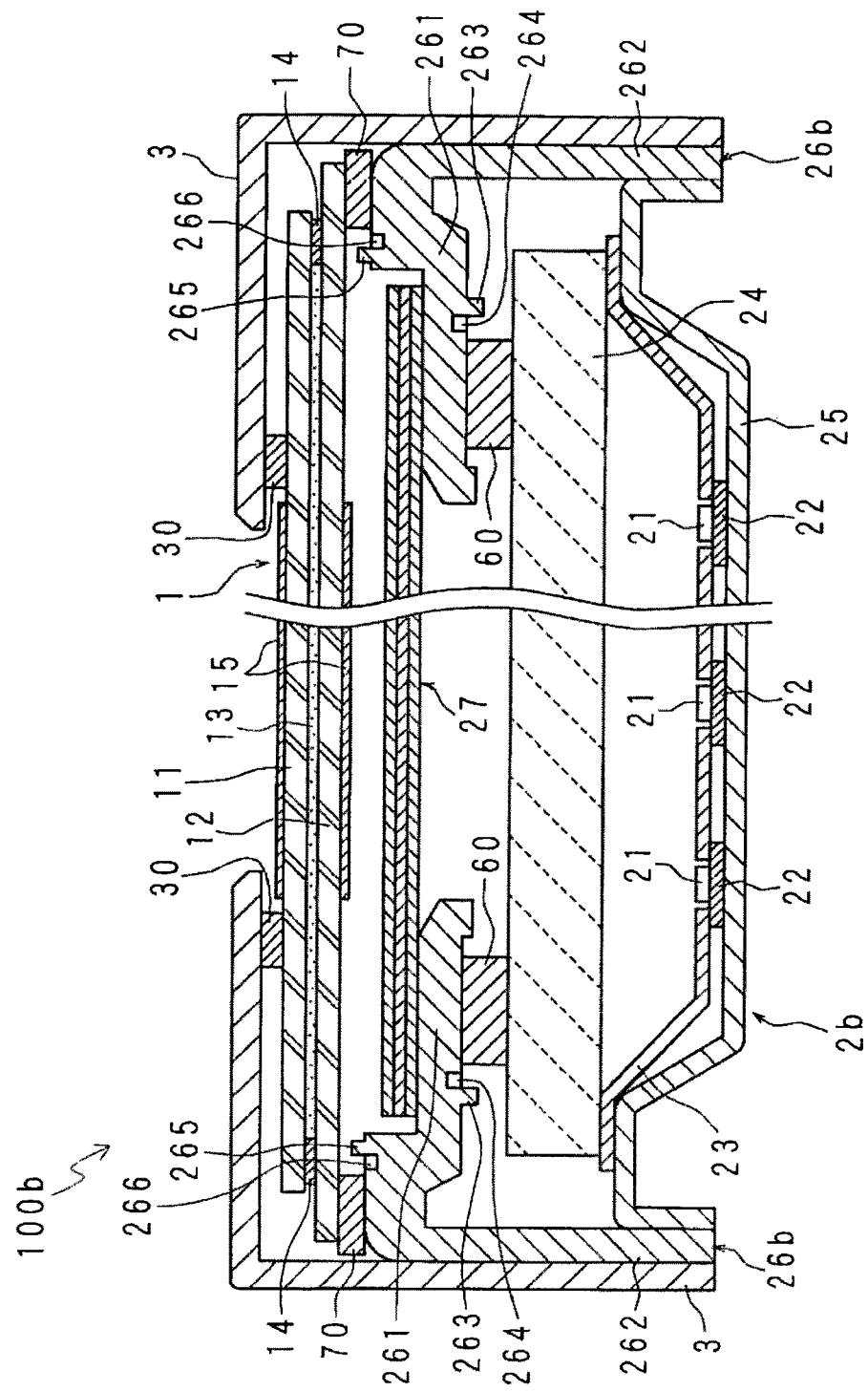
FIG. 4 is a cross-sectional view schematically showing a part of a display apparatus in embodiment 2.

FIG. 4 is a cross-sectional view schematically showing a part of a display apparatus 100b in embodiment 2. The display apparatus 100b in embodiment 2 has substantially the same structure as that of the display apparatus 100 in embodiment 1 except for a second chassis 26b. The same components as those in embodiment 1 will bear the identical reference signs thereto, and detailed descriptions thereof will be omitted.

The second chassis 26b is a metal or resin frame body including the rectangular frame portion 261 and the peripheral plate 262 protruding from the outer edge of the rectangular frame portion 261. The second chassis 26b has a frame shape. An inner circumference of the second chassis 26b approximately matches the outer circumference of the first chassis 25. The second chassis 26b includes, for example, four angle bars having an L-shaped cross-section that are coupled with each other. Among two inner surfaces of the angle bar (inner surfaces of the L-shape) included in the second chassis 26b (the bottom surface and the inner side surface in FIG. 4), the surface of the rectangular frame portion 261 (the bottom surface of the rectangular frame portion 261 in FIG. 4) has a rib 263 provided thereon along the entire length of the angle bars. Thus, the rib 263 is provided on the rectangular frame portion 261, and extends all along a circumferential direction thereof, namely, extends along the frame shape of the second chassis 26b. The second chassis 26 includes a groove (recessed portion) 264 formed therein. The groove 264 is formed at a position adjacent to an inner side surface of the rib 263. A plurality of the grooves 264 may be provided. In this case, the plurality of grooves 264 may have a predetermined length and may be provided at a predetermined interval along the rib 263.

In embodiment 2, among two outer surfaces of the angle bar (outer surfaces of the L-shape) included in the second chassis 26b (the top surface and the outer side surface in FIG. 4), the surface of the rectangular frame portion 261 has a rib 265 provided thereon. More specifically, the rib 265 is located at the position described below. The rectangular frame portion 261 includes a peripheral edge portion outer to the recessed portion formed along the peripheral edge of the inner opening of the rectangular frame portion 261. The rib 265 is provided on the peripheral edge portion, at a position closer to the inner opening, and extends all along a circumferential direction of the rectangular frame portion 261, namely, extends along the frame shape of the rectangular frame portion 261. The second chassis 26b also has a groove (recessed portion) 266 formed therein. The groove 266 is formed at a position adjacent to an outer surface of the rib 265. A plurality of the grooves 266 may be provided. In this case, the plurality of grooves 266 may have a predetermined length and may be provided at a predetermined interval along the rib 265.

As described above, in embodiment 2, the outer surface of the second chassis 26b (top surface in FIG. 4), namely, the surface facing the liquid crystal panel 1, has the rib 265 provided thereon and also has the grooves 266 provided therein. For allowing the liquid crystal panel 1 to be mounted on a light source device 2b, the spacer 70 is bonded and secured to the second chassis 26b along the rib 265, at a position closer to an outer edge of the second chassis 26b than the rib 265 and the grooves 266 are. The liquid crystal panel 1 is mounted on the light source device 2b while having the spacer 70 between the liquid crystal panel 1 and the light source device 2b.

Figure 5:
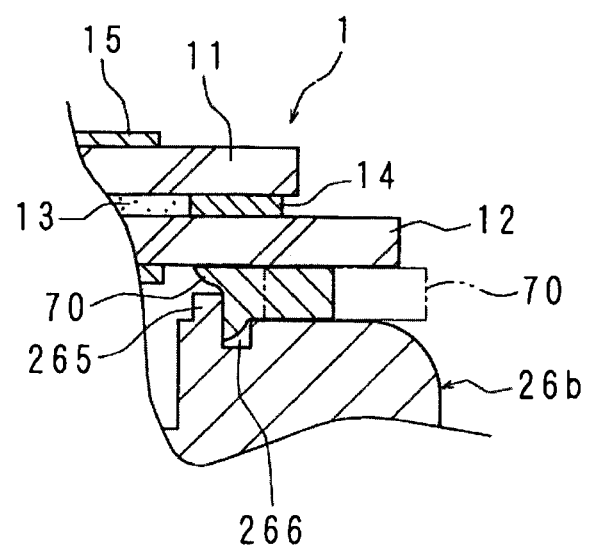
FIG. 5 shows a time-wise positional change of a spacer.

In embodiment 2, the spacer 70 is also suppressed from being displaced due to the repetition of the heating and the cooling of the display apparatus 100b. FIG. 5 shows a time-wise positional change of the spacer 70. FIG. 5 is an enlarged view of the spacer 70 and the vicinity thereof in the display apparatus 100b shown in FIG. 4. The two-dot chain line represents the position of the spacer 70 when the assembly of the display apparatus 100b is finished. When, for example, the display apparatus 100b is turned on, the light emitting diodes 21 are lit up and thus the temperature inside the light source device 2b starts rising. As a result, the second chassis 26b expands. The second chassis 26b has a lower thermal expansion coefficient than that of the diffusive plate 24 but has a higher thermal expansion coefficient than that and also of the glass substrate 12. Along with the temperature rise, the second chassis 26b expands. At the time when the temperature rise starts, the fractional force between the spacer 70 and the glass substrate 12 is stronger than the adhesive strength of the spacer 70 to the second chassis 26b. Therefore, the spacer 70 is not displaced although the second chassis 26b expands. Then, when the display apparatus 100b is turned off, the light emitting diodes 21 are extinguished and thus the temperature in the light source device 2b starts falling. As a result, the second chassis 26b contracts. At this point, the temperature is still high. Therefore, the adhesive strength of the spacer 70 to the second chassis 26b is stronger than the frictional force between the spacer 70 and the glass substrate 12. Thus, at the time when the temperature starts falling, the spacer 70 follows the contraction of the second chassis 26b toward an inner edge thereof and thus is moved toward the inner edge. Namely, when the temperature starts rising, the spacer 70 is not easily displaced toward the outer edge on the second chassis 26b, whereas when the temperature starts falling, the spacer 70 is easily displaced toward the inner edge. For this reason, as the light source device 2b is heated and cooled repeatedly, the spacer 70 is gradually displaced toward the inner edge, namely, toward the rib 265 as shown in FIG. 5.

In embodiment 2, the light source device 2b includes the rib 265 in order to suppress the spacer 70 from being displaced toward the inner edge. The rib 265 is lower than the spacer 70, and there is a gap between the rib 265 and the glass substrate 12 of the liquid crystal panel 1. Therefore, in the case where the force of displacement of the spacer 70 is strong, the spacer 70 is deformed to protrude into the gap and may undesirably go beyond the rib 265. In embodiment 2, the second chassis 26b of the light source device 2b includes the grooves 266 closer to the outer edge than the rib 265 is. When the spacer 70 reaches the rib 265 after being displaced continuously, the grooves 266 allow the spacer 70 to be deformed to protrude into the grooves 266. Therefore, a part of the deformed spacer 70, which would otherwise go beyond the rib 265, is absorbed into the grooves 266. As a result, the spacer 70 is suppressed from protruding through the gap between the rib 265 and the glass substrate 12, and the undesirable possibility that the spacer 70 goes beyond the rib 265 is decreased. If the spacer 70 goes beyond the rib 265 and is further displaced toward the inner edge between the liquid crystal panel 1 and the second chassis 26b, the spacer 70 loses the function of holding the liquid crystal panel 1 and the impact absorption function, a gap is formed between the liquid crystal panel 1 and the second chassis 26b, and the spacer 70 enters the display region. In this embodiment, such a loss of the holding function and she impact absorption function, the formation of the gap between the liquid crystal panel 1 and the second chassis 26b, and the entrance of the spacer 70 into the display region are prevented.

Like the grooves 264, the grooves 266 have a predetermined length and are provided at a predetermined interval. Therefore, a part of the spacer 70 is supported by an inner surface of the rectangular frame portion 261 corresponding to the predetermined interval (the inner surface is the surface corresponding to the inner surface in FIG. 2). Thus, a majority of, or the entirety of, the spacer 70 formed of a flexible material is suppressed from entering the grooves 266. Therefore, the contact area size between the spacer 70 and the glass substrate 12 of the liquid crystal panel 1 is suppressed from being decreased, and thus the decrease in the impact absorption function and formation of a gap between the spacer 70 and the glass substrate 12 are suppressed.

Embodiment 3

Figure 6:
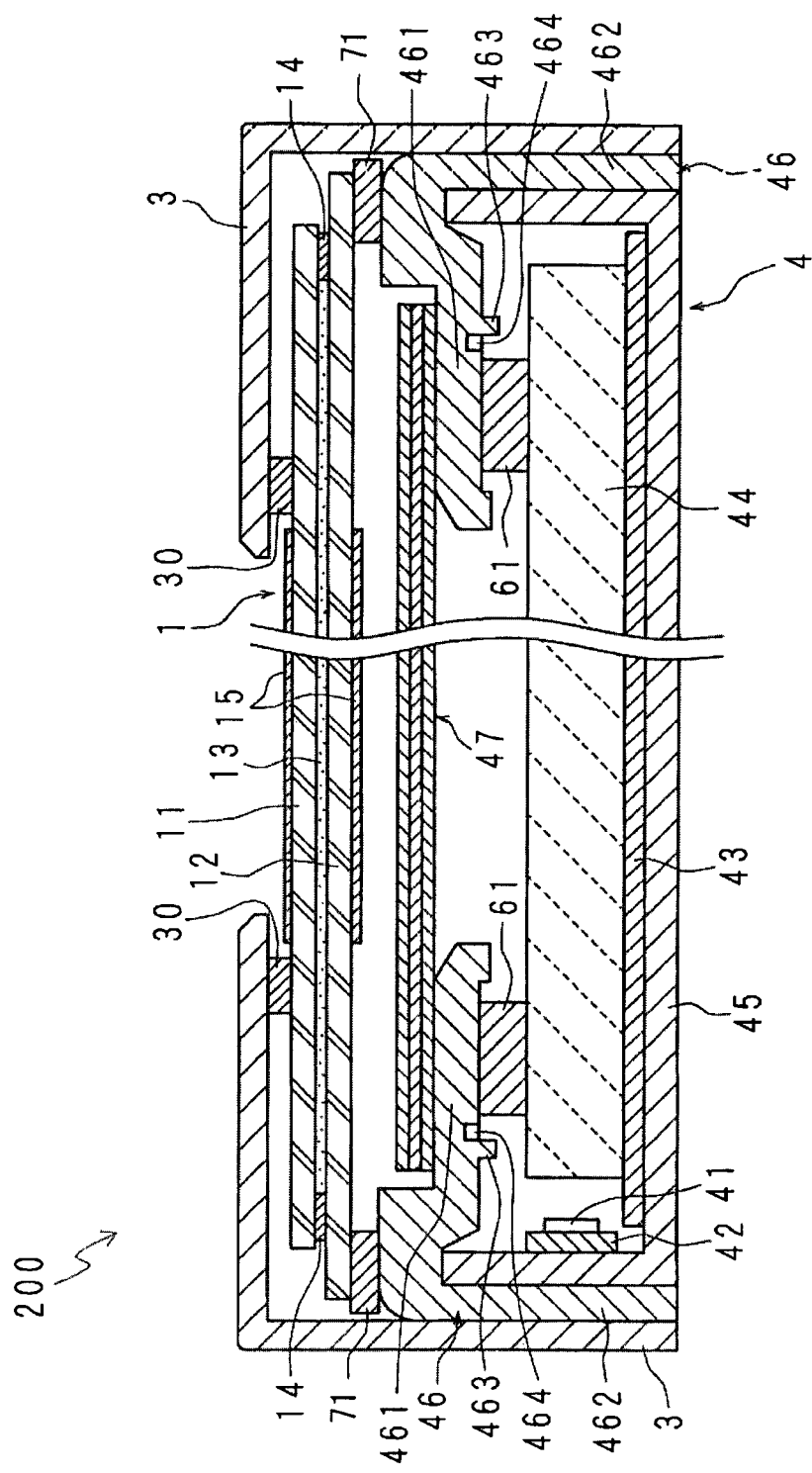
FIG. 6 is a cross-sectional view schematically showing a part of a display apparatus in embodiment 3.

FIG. 6 is a cross-sectional view schematically showing a part of a display apparatus 200 in embodiment 3. The display apparatus 200 includes the liquid crystal panel 1 and a light source device 4. The liquid crystal panel 1 has substantially the same structure as that in embodiment 1. The same components as those in embodiment 1 will bear the identical reference signs thereto, and detailed descriptions thereof will be omitted.

The light source device 4 is of an edge light type using light emitting diodes 41 as a light source.

The light emitting diodes 41 are each a light emitting element that includes a diode emitting blue light or ultraviolet light and a fluorescent material applied to a surface of the diode and thus emits white light. A substrate 42 is a strip-like plate. The plurality of light emitting diodes 41 are arrayed on a surface of the substrate 42, at generally the same interval in a length direction. Circuits controlling the light emitting diodes 41 to be on or off are also provided on the surface of the substrate 42.

A reflective sheet 43 is an optical sheet having a stack structure including a base substrate formed of a PET film and a reflective layer formed of a metal material or the like.

A light guide plate 44 is a rectangular light transmissive plate. The light guide plate 44 is formed of, for example, an acrylic resin. At one main surface of the light guide plate 44, scattering dots are formed by printing or laser processing.

An optical sheet 4 includes a group of rectangular sheets including a PET film as a base substrate. The optical sheet 47 includes, for example, three optical sheets, specifically, a lens sheet, a prism sheet and a diffusive sheet.

A first chassis 45 is a rectangular shallow metal box having an opening at one surface.

A second chassis 46 is a metal or resin frame body including a rectangular frame portion 461 and a peripheral plate 462 protruding from an outer edge of the rectangular frame portion 461. The second chassis 46 has a frame shape. An inner circumference of the peripheral plate 462 of the second chassis 46 approximately matches an outer circumference of a peripheral plate of the first chassis 45. The second chassis 46 includes, for example, four angle bars having an L-shaped cross-section that are coupled with each other (like the second chassis 26 shown in FIG. 2). Among two inner surfaces of the angle bar (inner surfaces of the L-shape) included in the second chassis 46 (the bottom surface and the inner side surface in FIG. 6), the surface of the rectangular frame portion 461 (the bottom surface of the rectangular frame portion 461 in FIG. 6) has a rib 463 provided thereon along the entire length of the angle bars. Thus, the rib 463 is provided on the rectangular frame portion 461, and extends all along a circumferential direction thereof, namely, extends along the frame shape of the second chassis 46. The second chassis 46 includes a plurality of grooves (recessed portion) 464 formed therein. The grooves 464 are formed at a position adjacent to an inner side surface of the rib 463. Like the grooves 264 shown in FIG. 2, the plurality of grooves 464 have a predetermined length and are provided at a predetermined interval along the rib 463.

The light source device 4 is assembled as follows, and is included in the display apparatus 200 together with the liquid crystal panel 1.

On a bottom surface of the first chassis 45, the reflective sheet 43 is located. The reflective sheet 43 is slightly smaller than the bottom surface of the first chassis 45. A side plate of the first chassis 45 has a height that is greater than a width of the substrate 42 (size of the substrate 42 in the up-down direction in FIG. 6). The substrate 42 is secured to one of inner side surfaces of the side plates, such that a surface of the substrate 42 on which the light emitting diodes 41 are mounted is directed inward. The light guide plate 44 is located on the reflective sheet 43. The light guide plate 44 is smaller than the reflective sheet 43, and has a thickness that is smaller than a depth of the first chassis 45. Therefore, the light guide plate 44 is accommodated in the first chassis 45 together with the reflective sheet 43. In this state, one side surface of the light guide plate 44 and the surface of the substrate 42 on which the light emitting diodes 41 are mounted face each other. The light guide plate 44 is located such that the surface having the scattering dots faces the reflective sheet 43.

Next, the second chassis 46 is located. On the bottom surface of the rectangular frame portion 461 of the second chassis 46, a spacer 61 is provided at a position closer to an inner edge of the second chassis 46 than the grooves 464 are. The spacer 61 extends all along a circumferential direction of the rectangular frame portion 461. The spacer 61 is higher than the rib 463. The spacer 61 is formed of a flexible material such as, for example, rubber or the like, and is bonded and secured to the second chassis 46 with a double-sided adhesive tape. The spacer 61 may be light-blocking. The second chassis 46 is located such that a surface of the second chassis 46 opposite to the surface bonded to the spacer 61 is in contact with a peripheral edge portion of the light guide plate 44, the rectangular frame portion 461 covers the peripheral edge portion of the light guide plate 44, and an outer circumferential surface of the side plate of the first chassis 45 is fit to an inner surface of the peripheral plate 462 of the second chassis 46. With such a structure, a top end of the side surface of the first chassis 45 is fit into a peripheral groove formed of inner corners of the L-shaped angle bars of the second chassis 46. As a result, the reflective sheet 43 and the light guide plate 44 are held between the first chassis 45 and the second chassis 46, and are accommodated together with the light emitting diodes 41.

Next, the optical sheet 47 is located, and thus the light source device 4 is formed. The optical sheet 47 is larger than an inner opening of the second chassis 46, namely, an inner opening of the rectangular frame portion 461. The rectangular frame portion 461 also has a recessed portion on a top surface thereof. The recessed portion is formed along a peripheral edge of the inner opening. A peripheral edge of the optical sheet 47 is fit into the recessed portion and is held by the rectangular frame portion 461.

The liquid crystal panel 1 is located on the light source device 4. The liquid crystal panel 1 is slightly smaller than the second chassis 46, and has such a size to cover the recessed portion of the rectangular frame portion 461 that is formed along the peripheral edge of the inner opening of the rectangular frame portion 461. A spacer 71 is provided on an outer peripheral edge portion of the second chassis 46 that is outer to the recessed portion along the peripheral edge of the inner opening of the rectangular frame portion 461. The spacer 71 extends all along a circumferential direction of the outer peripheral edge portion. The spacer 71 is formed of a flexible material such as, for example, rubber, and is bonded and secured to the second chassis 46 with a double-sided adhesive tape. The liquid crystal panel 1 is located on the light source device 4 such that an outer peripheral edge of an exposed surface of the glass substrate 12 of the liquid crystal panel 1 contacts the spacer 71.

Next, the bezel 3 is located. The bezel 3 and the spacer 30 are substantially the same as those in embodiment 1 and thus detailed descriptions thereof will be omitted. The inner circumference of the bezel 3 approximately matches an outer circumference of the peripheral plate 462 of the second chassis 46. The bezel 3 is located on the liquid crystal panel 1 such that an outer peripheral edge of an exposed surface of the glass substrate 11 of the liquid crystal panel 1 contacts the spacer 30. In this step, the liquid crystal panel 1 is located such that an outer circumferential surface of the peripheral plate 462 of the second chassis 46 is fit to an inner circumferential surface of the peripheral plate of the bezel 3. The bezel 3, the second chassis 46 and the first chassis 45 are coupled together, so that the liquid crystal panel 1 is held by the bezel 3 and the second chassis 46, and thus the display apparatus 200 is formed. In this state, a display region of the liquid crystal panel 1 is exposed from the inner opening of the bezel 3 and is visible from outside.

In the display apparatus 200 having the above-described structure, linear light beams from the light emitting diodes 41 located on the substrate 42 in the light source device 4 enter the light guide plate 44. In the light guide plate 44, the light beams entering the inside thereof advance while being totally reflected by the reflective sheet 43 and partially reflected by a main surface of the light guide plate 44 opposite to the surface facing the reflective sheet 43. Among the light beams advancing in the light guide plate 44, the light beams scattered by the scattering dots of the light guide plate 44 are output from the surface of the light guide plate 44 facing the optical sheet 47. Thus, the light is uniformly output from various positions of the surface of the light guide plate 44 facing the optical sheet 47. The light output from the light guide plate 44 passes the optical sheet 47 and thus is output as more uniform planar light. In this manner, the light source device 4 acts as a planar light source that outputs light of a uniform illuminance. The planar light output from the optical sheet 47 is directed toward the liquid crystal panel 1, and is modulated at positions corresponding to a plurality of pixels in the liquid crystal panel 1 based on an image signal. In this manner, a viewer visually recognizes a moving image on the display apparatus 200.

In the light source device 4 in embodiment 3, the light guide plate 44 expands and contracts as a result of being heated and cooled mainly by a heat source, which is the light emitting diodes 41. Such expansion and contraction of the light guide plate 44 displaces the spacer 61 toward an outer edge of the second chassis 46. The spacer 61 is bonded to the second chassis 46, which holds the light guide plate 44 together with the first chassis 45. Such displacement is stopped by the spacer 61 contacting the rib 463. However, in the case where the force of displacement is strong, the spacer 61 may undesirably go beyond the rib 463. In embodiment 3, the second chassis 46 includes the grooves 464 at a position closer to an outer edge thereof (the outer edge is the edge corresponding to the outer edge in FIG. 2) than the rib 463 is. More specifically, the grooves 464 are located at a position closer to the spacer 61 than the rib 463 is. The grooves 464 prevent the spacer 61 from going beyond the rib 463. How the rib 463 and the grooves 464 prevent the spacer 61 from going beyond the rib 463 is substantially the same as described above in detail with reference to FIG. 3 in embodiment 1.

The grooves 464 have a predetermined length and are provided at a predetermined interval. Therefore, a part of the spacer 61 is supported by an inner surface of the rectangular frame portion 461 corresponding to she predetermined interval (the inner surface is the surface corresponding to the inner surface of the rectangular frame portion 261 in FIG. 2). Since the plurality of grooves 464 are provided at a predetermined interval, a majority of, or the entirety of, the spacer 61 formed of a flexible material is suppressed from entering the grooves 464. Therefore, the contact area size between the spacer 61 and the light guide plate 44 is suppressed from being decreased, and thus the decrease in the impact absorption function and formation of a gap between the spacer 61 and the light guide plate 44 are suppressed.

The light source device 4 in embodiment 3 may have the rib and the grooves provided in a top surface of the second chassis 46 like in embodiment 2, so that the movement of the spacer 71 provided between the liquid crystal panel 1 and the second chassis 46 is prevented.

The embodiments disclosed above are illustrative in any sense and are not to be construed as being limiting the present invention. The scope of the present invention is not limited by any of the above-described embodiments, but is intended to encompass the claims and equivalents thereof and also encompass all the modifications and alternatives of the claims.

What is claimed is:

1. A light source device, comprising:
   a light source;
   a light-transmissive plate having a side surface or a main surface facing the light source;
   a holding frame having a frame-shaped surface holding a peripheral edge portion of the light-transmissive plate, the holding frame having a frame shape; and
   a spacer provided between the peripheral edge portion of the light-transmissive plate and the frame-shaped surface of the holding frame,
   wherein the holding frame includes:
      a first rib provided on the frame-shaped surface, at a position closer to an outer edge of the holding frame than a contact position of the frame-shaped surface in contact with the spacer, the first rib extending along the frame shape;
      a second rib provided on an opposite surface opposite to the frame-shaped surface, the second rib being along the frame shape;
      a first recessed portion provided between the first rib and the contact position; and
      a second recessed portion provided at a position closer to the outer edge of the holding frame than the second rib.

2. The light source device according to claim 1, wherein:
   the first rib is provided on the frame-shaped surface all along a circumferential direction thereof; and the first recessed portion comprises a plurality of linear grooves along the first rib.

3. A display apparatus, comprising:
a light source;
a light-transmissive plate having a side surface or a main surface facing the light source;
a holding frame having a first frame-shaped surface holding a peripheral edge portion of the light-transmissive plate, the holding frame having a frame shape;
a first spacer provided between the peripheral edge portion of the light-transmissive plate and the first frame-shaped surface of the holding frame;
a liquid crystal panel having a peripheral edge portion held by a second frame-shaped surface of the holding frame opposite to the first frame-shaped surface, the liquid crystal panel facing the light-transmissive plate; and
a second spacer provided between the peripheral edge portion of the liquid crystal panel and the second frame-shaped surface of the holding frame,
wherein:
light output from the light-transmissive plate is directed toward the liquid crystal panel; and
the holding frame comprises:
a first rib provided on the first frame-shaped surface, at a position closer to an outer edge of the holding frame than a first contact position of the first frame-shaped surface in contact with the first spacer, the first rib extending along the frame shape; and
a first recessed portion provided between the first rib and the first contact position.

4. The display apparatus according to claim 3, wherein the holding frame further comprises:
a second rib provided on the second frame-shaped surface, at a position closer to an inner edge of the holding frame than a second contact position of the second frame-shaped surface in contact with the second spacer, the second rib extending along the frame shape; and
a second recessed portion provided between the second rib and the second contact position.

* * * * *